United States Patent

Pekarcik et al.

[11] 4,199,195
[45] Apr. 22, 1980

[54] DYNAMIC/FRICTION BRAKE BLENDING CONTROL SYSTEM

[75] Inventors: John T. Pekarcik, Murrysville; Richard J. Mazur, Pittsburgh, both of Pa.

[73] Assignee: Westinghouse Air Brake Company, Wilmerding, Pa.

[21] Appl. No.: 951,934

[22] Filed: Oct. 16, 1978

[51] Int. Cl.² ............................................. B60T 13/74
[52] U.S. Cl. ...................................................... 303/3
[58] Field of Search ...................... 188/195; 303/3, 16, 303/20, 22 R, 22 A

[56] References Cited

U.S. PATENT DOCUMENTS

| | | | |
|---|---|---|---|
| 3,260,553 | 7/1966 | Jeffrey | 303/3 X |
| 3,814,483 | 6/1974 | Coiner et al. | 303/22 R X |
| 4,045,093 | 8/1977 | Bridigum | 303/3 |
| 4,073,541 | 2/1978 | Nagase | 303/3 |

*Primary Examiner*—Douglas C. Butler
*Attorney, Agent, or Firm*—R. W. McIntire, Jr.

[57] ABSTRACT

A dynamic/friction brake blending control system in which a brake pipe pressure responsive control valve device provides a friction brake pressure that is connected to the vehicle brake cylinders via a blending relay valve device having a self-lapping piston valve assembly spring biased to a brake application position in which the friction brake pressure from the control valve device is relayed unmodulated to the brake cylinders in the absence of dynamic brake effort on the vehicle. A control piston of the piston valve assembly is subject to the friction brake pressure from the control valve, while a friction brake feedback piston is subject to the friction brake pressure connected from the blending relay valve to the brake cylinders. These pistons act on the piston assembly in opposite directions and have equal effective pressure areas. A dynamic brake feedback piston is subject to the feedback signal of the dynamic brake effort sensed by a pressure transducer and acts on the piston assembly in cooperation with the friction brake feedback piston, such as to modulate the friction brake pressure from the blending relay valve to the brake cylinders as the dynamic brake effort increases.

6 Claims, 1 Drawing Figure

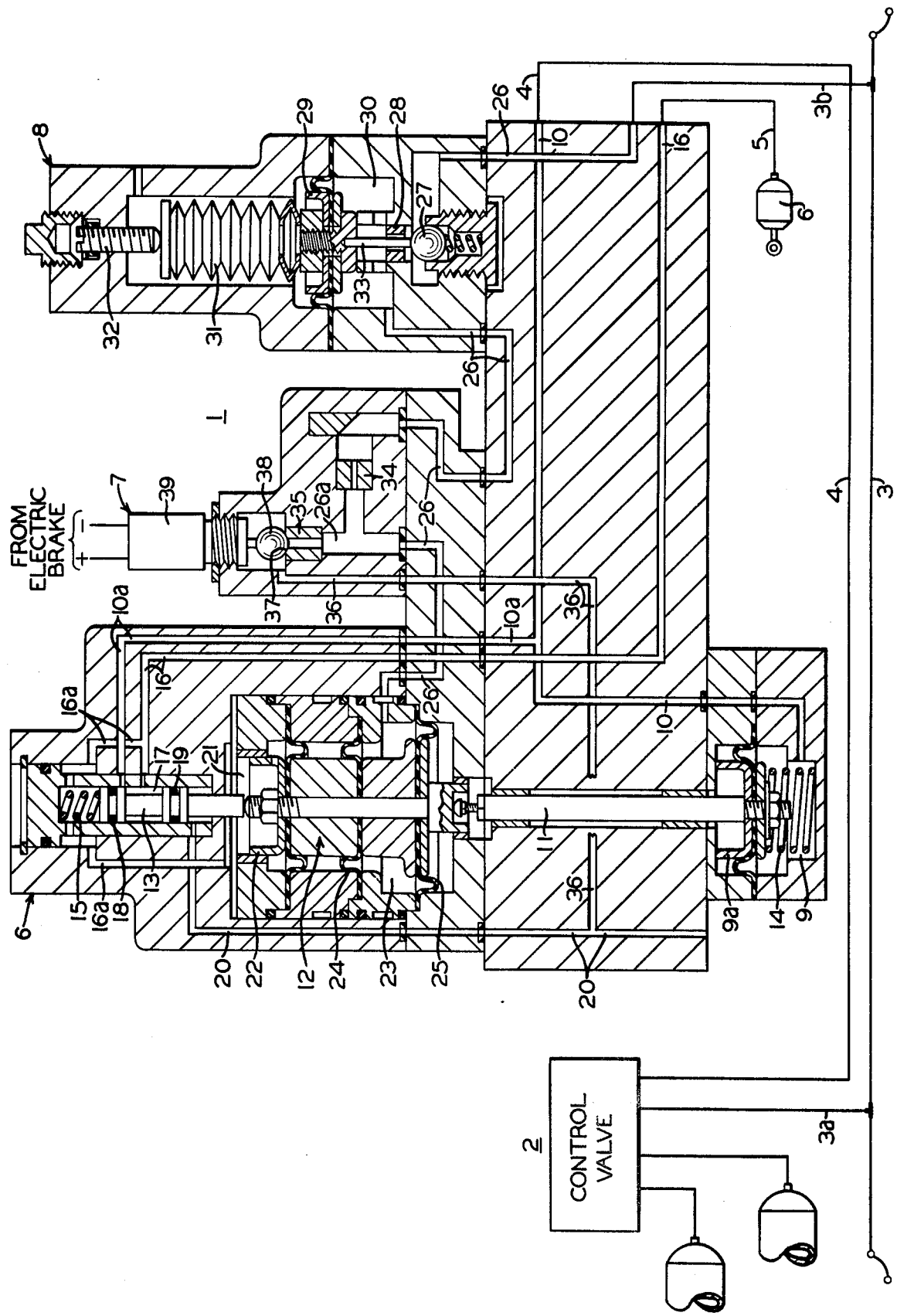

DYNAMIC/FRICTION BRAKE BLENDING CONTROL SYSTEM

BACKGROUND OF THE INVENTION

The present invention is related to a railway vehicle brake system of the type combining electric and friction braking and particularly to a system in which the electric and friction braking is continuously blended by reason of the friction brake supplementing the electric brake an amount dependent upon the deficiency of the electric brake in satisfying the brake command.

Such brake blending arrangements generally fall into two classes, one in which the brake command and degree of available electric brake are compared electrically to obtain an error signal, in response to which the friction brake is applied, and the other in which the comparison is accomplished pneumatically. These classes of brake blending arrangements are depicted in FIGS. 1 and 2 of U.S. Pat. No. 4,073,541, issued Feb. 14, 1978. In the latter one of the above-mentioned classes, the pneumatic brake command signal for each car is derived from a continuous pipe that passes through each car of the train. It is well known that such trainline pipes experience a higher incidence of breakage than other car mounted piping, due in part to the hose coupling and associated fittings between the respective cars and the relative movement between the cars. Since a loss of the pneumatic brake command signal occurs with breakage of a trainline pipe, it follows that the friction brake pressure is also depleted due to the error signal, produced in accordance with the deficiency of the electric brake relative to the brake command, being accordingly reduced to zero. This of course is an undesirable characteristic, since without the availability of a friction brake, at least as a back-up brake, a train is in danger of being without any brakes whatsoever, particularly at low speeds when the effectiveness of the electric brake typically fades.

SUMMARY OF THE INVENTION

The object of the present invention, therefore, is to provide a friction/electric brake blending control system, in which loss of the pneumatic trainline brake command signal automatically conditions the brake blending system to apply friction braking to the extent required to supplement the electric braking.

In accordance with this objective, a self-lapping type brake blending relay valve device is subject on its control piston to the pressure delivered to the car brake cylinders via a car control valve device. The control valve device responds to reductions of fluid pressure carried in a trainline brake pipe to increase brake cylinder presssure accordingly. Should a trainline break occur, with a resultant loss of brake pipe pressure (brake command), the brake cylinder pressure and consequently the pressure acting on the blending relay control piston is increased, thus assuring delivery of brake pressure to the car brake cylinders to provide friction braking in the event the electric braking is less than the brake command.

Other objects and attendant advantages will become apparent from the following more detailed description when taken with the accompanying single FIGURE drawing showing a diagrammatic of a brake blending valve device and its connection in the system of the present invention.

DESCRIPTION AND OPERATION

The railway vehicle brake system includes a brake blending valve device 1 and a conventional type car control valve device 2, which may be similar to the control valve device shown and described in U.S. Pat. No. 2,926,967, issued Mar. 1, 1960. A brake pipe 3, to which an operator's brake valve device (not shown) is connected for varying the brake pipe pressure, extends by way of branch passage 3a to control valve device 2 and by way of a branch passage 3b to brake blending valve device 1.

As shown in the above-mentioned Patent, control valve device 2 comprises a self-lapping piston valve assembly having a control piston subject opposingly to brake pipe pressure from branch passage 3a and to the pressure in a control reservoir that is charged from brake pipe pressure. Valve means associated with the piston valve assembly is operative responsive to movement of the piston valve assembly when a differential is established between the brake pipe and control reservoir pressures to supply and release fluid pressure in a delivery pipe 4 that is connected to blending valve device 1. Also connected to blending valve device 1 via brake cylinder pipe 5 is a brake cylinder device 6 for providing friction braking on the vehicle.

Blending valve device 1 comprises a relay valve portion 6, a pressure transducer 7 and a pressure regulator 8.

Delivery pipe 4 is connected via a passage 10 of the blending valve device to a chamber 9 formed by the valve casing and a control piston 9a. A stem 11 of control piston 9a acts by way of a feedback piston assembly 12 to operate a spool valve 13. A spring 14 acts upwardly on control piston 9a to urge spool valve 13 towards application position, while a spring 15 that is lighter than spring 14 acts downwardly on spool valve 13 to urge movement thereof toward release position. A branch 10a of passage 10 is connected to spool valve 13, as is a passage 16 to which brake cylinder pipe 5 is connected. An annular groove 17 of spool valve 13 is flanked by O-ring seals 18 and 19 to control fluid pressure communication between passages 10a and 16, and also between passage 16 and an atmospheric passage 20.

A branch 16a of passage 16 is connected to a pressure chamber 21 formed between the casing and a friction brake feedback piston 22 of piston assembly 12. A modulating pressure chamber 23 formed between a pair of differential dynamic brake feedback pistons 24 and 25 is connected to brake pipe branch passage 3b via passage 26.

Pressure regulator 8 comprises a spring loaded ball check valve 27 in passage 26, a check valve seat 28, a diaphragm piston 29 that cooperates with the casing to form a pressure chamber 30, a Belleville type spring 31 and an adjusting screw 32 for setting the force under which piston 29 is loaded. A stem 33 of piston 29 is engageable with ball check valve 27 to unseat it under the influence of spring 31.

Interposed between pressure regulator 8 and relay valve portion 6, in passage 26, is pressure transducer 7 having a first choke 34 in passage 26 in series with a second choke 35 in a branch 26a of passage 26. Choke 35 includes a valve seat 37 with which a ball valve 38 is engageable. Ball valve 38 is urged toward seat 37 by the force exerted by an electrically driven motor 39 to which is connected an electric signal representative of the dynamic brake effort on the vehicle.

In order to prevent control variation in brake pipe pressure from affecting the modulating action of piston assembly 12, pressure regulator 8 is set to limit and maintain the pressure supplied to transducer 7 to a value corresponding to no more than the lower value of brake pipe pressure during a full service brake application; e.g., 80 psi. in the case where the brake pipe charge is 100 psi. with a 20 psi. full service reduction.

When a brake application is made by effecting a reduction of the brake pipe pressure, the reduction is sensed at control valve device 2. A pressure differential is thus established across the control piston of the control valve self-lapping assembly to move the assembly to brake application position, in which position the valve means associated therewith supplies fluid pressure to delivery pipe 4. This pressure in delivery pipe 4 represents the friction brake pressure, which is connected to brake cylinder device 6 by way of blending valve device 1 to permit modulation of this friction brake pressure in accordance with the effective dynamic brake effort.

In that the vehicle dynamic brakes normally respond more slowly than the friction brakes, it can be reasonably assumed that full friction braking is initially required to brake the vehicle. The pressure in delivery pipe 4 is connected by way of passage 10, in blending valve device 1, to control piston chamber 9 and via passage 10a to spool valve 13. Since the spool valve is normally biased to application position by reason of the relative strength of springs 14 and 15, pressure in passage 10a is connected via spool valve groove 17, passage 16 and pipe 5 leading to brake cylinder 6. This brake cylinder pressure is also conducted via passage 16a to chamber 21, where it acts on piston 22 in opposition to the pressure effective on control piston 9a. Since the effective area of these pistons is equal, the feedback piston assembly 12 is stabilized in its application position under the influence of spring 14. Consequently, the delivery pressure from control valve device 2 is relayed to the vehicle brake cylinders unmodulated via blending valve device 1.

Pressure regulator 8 is adjusted to regulate the air pressure supplied to passage 26 from brake pipe 3 and branch pipe 3b. As the pressure in passage 26 builds up in chamber 30 under diaphragm piston 29, ball valve 27 is moved by its spring toward seat 28 in opposition to spring 31, thereby metering the air flow past ball valve 28, so as to maintain the pressure downstream of pressure regulator 8 at a predetermined value corresponding to the setting of adjusting spring 31.

The downstream air flowing in passage 26 is supplied to modulating pressure chamber 23 of feedback piston assembly 12 via pressure transducer 7. Under the assumed condition of no dynamic brake effectiveness, the current of transducer force motor 39 is substantially zero. Accordingly, ball valve 38 is unbalanced by the air pressure under the ball, which is unseated to vent the downstream pressure in passage 26 to atmosphere via passage 36 and passage 20. It will be appreciated, therefore, that in the absence of dynamic braking, the metering of downstream pressure in passage 26 to atmosphere is maximum, thereby preventing any buildup of pressure in chamber 23.

As the dynamic brake effectiveness gradually develops, however, the degree of energization of force motor 39 urges ball valve 38 toward seat 37, thereby decreasing the amount of air metered to atmosphere and accordingly proportionately increasing the degree of pressure buildup in chamber 23. As a result of this increasing pressure in chamber 23, a downward acting force is exerted on feedback piston assembly 12 sufficient to overcome the bias effect of spring 14 and thus force assembly 12 to its downward-most position. Spring 15 causes spool valve 13 to follow this deflection of assembly 12, so that spool 13 is shifted from application to release position. Spool O-ring 18 cuts off passage 10a from passage 16, while groove 17 concurrently connects passage 16 to atmosphere via passage 20 to accordingly vent the brake cylinder pressure. Since the pressure effective in chamber 21 is also vented with passage 16 via passage 16a, a force balance is restored at feedback piston assembly 12 when the level of friction braking has been reduced an amount corresponding to the increase in dynamic brake effectiveness. When this force balance occurs, spool valve 13 is moved to its lap position, in which spool O-ring 19 cuts off passage 16 from atmospheric passage 20 and concurrently O-ring 18 cuts off passage 10a from passage 16 and the assembly is stabilized with no further change in the friction brake pressure.

It will be appreciated, therefore, that as the dynamic brake becomes fully effective, the friction brake will be modulated either to zero or to some preselected minimum value, irrespective of the pressure supplied to delivery pipe 4 from the control valve device 2.

It will be still further appreciated that in the event of a loss of brake pipe pressure, blending valve device 1 will be automatically conditioned to assume its normal position, i.e., release position of spool valve 13, so that the pressure supplied to delivery pipe 4 by control valve device 2 is simply relayed via the blending valve device 1 to brake cylinder 6. This safeguard against loss of friction braking is due to the fact that brake pipe pressure is supplied to transducer 7 and thence to chamber 23 of relay valve portion 6 to control the modulating action of the blending valve. In the absence of brake pipe pressure, therefore, the modulating action of the blending valve device is suppressed, in effect, even though there may be sufficient dynamic braking to warrant such friction brake modulation. Thus, an undesirable condition of no friction brake availability, due to the loss of trainline control pressure, is avoided by the manner in which the present blending valve device 1 is arranged with control valve device 2.

Having now described the invention, what we claim as new and desire to secure by Letters Patent, is:

1. A dynamic/friction brake blending control system for a railway vehicle to which a brake command signal is connected, said brake blending control system comprising:
   (a) fluid pressure operated brake means for providing friction braking effort;
   (b) a control valve device operative responsive to said brake command signal for supplying fluid brake pressure to said brake means;
   (c) transducer means for providing a fluid pressure feedback signal representative of the degree of dynamic brake effort on said vehicle; and
   (d) a self-lapping relay valve device via which said fluid brake pressure is connected to said brake means comprising:
      (i) a supply passage to which said fluid brake pressure is connected from said control valve device;
      (ii) a delivery passage connected to said brake means; and (iii) a piston valve assembly for controlling fluid pressure communication between said supply and delivery passages comprising:
  (1) a control piston subject to said fluid brake pressure in said supply passage; and
  (2) a dynamic brake feedback piston subject to said feedback signal for exerting a force on said piston valve assembly in opposition to the force exerted thereon by said control piston for modulating said fluid brake pressure delivered to said brake means in accordance with the effectiveness of said dynamic brake.

2. The brake blending control system as recited in claim 1, further comprising a brake pipe for providing said brake command signal as an inverse function of the degree of vehicle braking desired.

3. The brake blending control system as recited in claim 2, wherein said transducer means comprises:
  (a) a pair of chokes in series via which the fluid pressure in said brake pipe is connected to atmosphere;
  (b) a valve seat formed about the orifice of the downstream one of said chokes;
  (c) a ball valve engageable with said valve seat;
  (d) a force motor subject to said feedback signal to urge movement of said ball toward engagement with said valve seat in opposition to said brake pipe pressure acting on said ball valve to vary the venting of pressure therepast, whereby said brake pipe pressure effective between said chokes provides said feedback signal in direct proportion to the effective dynamic brake effort.

4. The brake blending control system as recited in claim 3, further comprising pressure regulator valve means for providing a predetermined constant pressure supply to said pair of chokes from said brake pipe.

5. The brake blending control system as recited in claim 1, wherein said piston valve assembly further comprises a friction brake feedback piston subject to the fluid brake pressure effective in said delivery passage to exert a force on said piston valve assembly in opposition to the force exerted thereon by said control piston.

6. The brake blending control system as recited in claim 5, wherein said control piston and said friction brake feedback piston have equal effective pressure areas, said piston valve assembly having bias means for exerting a force thereon in the direction of said control piston.

* * * * *